United States Patent
Liang et al.

(10) Patent No.: US 11,776,120 B2
(45) Date of Patent: Oct. 3, 2023

(54) METHOD FOR PREDICTING MORPHOLOGICAL CHANGES OF LIVER TUMOR AFTER ABLATION BASED ON DEEP LEARNING

(71) Applicant: Chinese PLA General Hospital, Beijing (CN)

(72) Inventors: Ping Liang, Beijing (CN); Jie Yu, Beijing (CN); Linan Dong, Beijing (CN); Zhigang Cheng, Beijing (CN); Shouchao Wang, Beijing (CN); Xiaoling Yu, Beijing (CN); Fangyi Liu, Beijing (CN); Zhiyu Han, Beijing (CN)

(73) Assignee: Chinese PLA General Hospital, Beijing (CN)

( * ) Notice: Subject to any disclaimer, the term of this patent is extended or adjusted under 35 U.S.C. 154(b) by 0 days.

(21) Appl. No.: 17/773,057

(22) PCT Filed: Nov. 2, 2020

(86) PCT No.: PCT/CN2020/125768
§ 371 (c)(1),
(2) Date: Apr. 29, 2022

(87) PCT Pub. No.: WO2021/088747
PCT Pub. Date: May 14, 2021

(65) Prior Publication Data
US 2023/0123842 A1    Apr. 20, 2023

(30) Foreign Application Priority Data
Nov. 4, 2019 (CN) .......................... 201911067810.8

(51) Int. Cl.
*G06T 7/00*    (2017.01)
*G06N 3/02*    (2006.01)

(52) U.S. Cl.
CPC .............. *G06T 7/0012* (2013.01); *G06N 3/02* (2013.01); *G06T 2207/10072* (2013.01);
(Continued)

(58) Field of Classification Search
CPC ......... G06T 7/0012; G06T 2207/10072; G06T 2207/30056; G06T 2207/30096;
(Continued)

(56) References Cited

U.S. PATENT DOCUMENTS 10,610,302 B2 *   4/2020   Comaniciu ........... G06T 11/003
2010/0063392 A1   3/2010   Nishina et al.
2019/0046148 A1 * 2/2019   Suehling ................. G06N 3/08

FOREIGN PATENT DOCUMENTS

CN   108257135 A   7/2018
CN   109859833 A   6/2019
(Continued)

OTHER PUBLICATIONS

English translation of CN 110175958 A (Year: 2019).*
(Continued)

*Primary Examiner* — Jon Chang
(74) *Attorney, Agent, or Firm* — Bayramoglu Law Offices LLC

(57) ABSTRACT

A method for predicting the morphological changes of liver tumor after ablation based on deep learning includes: obtaining a medical image of liver tumor before ablation and a medical image of liver tumor after ablation; preprocessing the medical image of liver tumor before ablation and the medical image of liver tumor after ablation; obtaining a preoperative liver region map, postoperative liver region map, and postoperative liver tumor residual image map; obtaining a transformation matrix by a Coherent Point Drift (CPD) algorithm and obtaining a registration result map according to the transformation matrix; training the network
(Continued)

by a random gradient descent method to obtain a liver tumor prediction model; using the liver tumor prediction model to predict the morphological changes of liver tumor after ablation. The method provides the basis for quantitatively evaluating whether the ablation area completely covers the tumor and facilitates the postoperative treatment plan for the patient.

8 Claims, 5 Drawing Sheets

(52) U.S. Cl.
CPC ............... *G06T 2207/20084* (2013.01); *G06T 2207/30056* (2013.01); *G06T 2207/30096* (2013.01)

(58) Field of Classification Search
CPC ......... G06T 2207/20084; G06T 7/0016; G06T 7/35; G06T 2207/10081; G06T 2207/10088; G06T 2207/20076; G06T 2207/20081; G06T 2207/20124; G06T 7/11; G06T 7/344; G06T 7/187; G06T 7/13; G06T 7/33; G06T 2207/30101; G06N 3/02; G06N 3/045; G06N 7/01; G06N 3/084; G06N 20/00
See application file for complete search history.

(56) References Cited

FOREIGN PATENT DOCUMENTS

| | | | | |
|---|---|---|---|---|
| CN | 110175958 A | * | 8/2019 | ............. G06T 5/005 |
| CN | 110175958 A | | 8/2019 | |
| CN | 110782474 A | | 2/2020 | |

OTHER PUBLICATIONS

Fikret et al., "Prediction of Laser-Induced Thermal Damage with Artificial Neural Networks." Laser Phys. 29, 075205, Jun. 2019, 7 pages (Year: 2019).*

* cited by examiner

METHOD FOR PREDICTING MORPHOLOGICAL CHANGES OF LIVER TUMOR AFTER ABLATION BASED ON DEEP LEARNING

CROSS REFERENCE TO THE RELATED APPLICATIONS

This application is the national phase entry of International Application No. PCT/CN2020/125768, filed on Nov. 2, 2020, which is based upon and claims priority to Chinese Patent Application No. 201911067810.8, filed on Nov. 4, 2019, the entire contents of which are incorporated herein by reference.

TECHNICAL FIELD

The present invention relates to the field of minimally invasive ablation, particularly to a method for predicting morphological changes of liver tumor after ablation based on deep learning.

BACKGROUND

In recent years, image-guided percutaneous thermal ablation has become one of the most promising minimally invasive treatment methods for solid tumors such as liver, kidney and breast. Among them, microwave ablation is guided by ultrasound, computed tomography (CT) and other images, the ablation needle is inserted into the tumor, and the local polar molecules are vibrated and rubbed to produce high temperature by releasing electromagnetic wave, so as to achieve the purpose of tumor inactivation. Compared with the traditional surgery, it has the advantages of small trauma, good curative effect, fast recovery, repeatability, low cost, and can improve the immune function of the body. It can achieve a good curative effect of completely inactivating the tumor without surgery. However, different from the clear view of tumor and treatment area in open surgery, minimally invasive ablation is conducted under the guidance of intraoperative two-dimensional images. Whether the treatment area completely covers the tumor and reaches enough safety boundary needs to be evaluated by comparing the preoperative and postoperative images. However, due to the changes of patients' postures before and after surgery and the soft tissue deformation caused by the treatment process, including the tissue contraction in the ablation inactivated area and the expansion of liver regeneration volume, it is impossible to accurately evaluate the curative effect only by preoperative and postoperative two-dimensional image comparison or three-dimensional rigid registration. Therefore, it is a difficult problem to realize the accurate curative effect evaluation of tumor ablation in three-dimensional space through preoperative and postoperative images.

In recent years, point cloud registration is a common registration method for preoperative and postoperative three-dimensional image evaluation. At present, a large number of methods have been studied for 3D image registration, among which the iterative closest point (ICP) is the most classic and commonly used algorithm. Most of the follow-up algorithms are based on it. However, no matter which method, in the registration process, only the image's own characteristics are considered, and the changes of local tissue shrinkage caused by high temperature in the clinical treatment process are not taken into account, which leads to the inaccuracy of the evaluation results.

Deep learning is derived from artificial neural network. It can grasp the inherent law through the learning of sample data, and then realize the speculation and judgment of similar data. It is the only way to realize artificial intelligence. With the development of medical informatization and digital diagnosis, and the increasing amount of medical data, deep learning may provide strong support for the medical field.

SUMMARY

In order to solve the above-mentioned problems of the prior art, the invention aims to provide a method for predicting the morphological change of liver tumor after ablation based on deep learning, which can assist doctors to evaluate a curative effect after operation and lay a foundation for the development of a follow-up treatment plan.

The technical solution of the present invention is that a method for predicting the morphological changes of liver tumor after ablation based on deep learning, includes the following steps:

obtaining a medical image of liver tumor before ablation and a medical image of liver tumor after ablation;

preprocessing the medical image of liver tumor before ablation and the medical image of liver tumor after ablation;

obtaining a preoperative liver region map and a preoperative liver tumor region map from a medical image map before ablation, and obtaining a postoperative liver region map, a postoperative ablation region map and a postoperative liver tumor residual image map from the medical image map after ablation;

registering the preoperative liver region map and the postoperative liver region map by a Coherent Point Drift (CPD) algorithm, and obtaining a transformation matrix; obtaining a registration result map of the medical image map after ablation corresponding to the preoperative liver region map and the preoperative liver tumor region map according to the transformation matrix;

using the medical image map before ablation, the preoperative liver region map, the preoperative liver tumor region map and the registration result map as an input of U-net network, and using the postoperative liver tumor residual image map as a real training label; training the network by a random gradient descent method to obtain a liver tumor prediction model; and using the liver tumor prediction model to predict the morphological changes of liver tumor after ablation.

As a preferred method, the medical image comprises images obtained by CT and magnetic resonance imaging (MRI).

As an optimal method, the pre-processing of the medical image of liver tumor before ablation and the medical image of liver tumor after ablation is as follows: dividing the data set into groups according to influencing factors of liver, then reading the medical image of liver tumor before ablation and the medical image of liver tumor after ablation, and processing the medical images by Gaussian de-noising, gray histogram equalization, image contrast enhancement, rotation, flipping and data standardization.

As a preferred method, the liver influencing factors comprise a liver state, a tumor type and a pathological type.

As the preferred method, the obtaining of a preoperative liver region map and a preoperative liver tumor region map from a medical image map before ablation, and the obtaining of a postoperative liver region map, a postoperative ablation region map and a postoperative liver tumor residual image map from the medical image map after ablation are: marking the preoperative liver region map, preoperative liver tumor region map and postoperative liver region map by a maximum flow/minimum cut algorithm; introducing a potential energy field function based on a global and local region representation as a constraint in a segmentation process, and establishing an adaptive hybrid variational model; using a maximum flow/minimum cut algorithm to solve an energy equation minimization; determining a target region selectively according to gray information, boundary gradient, texture information and local context information in different image regions.

As the preferred method, the registering of the preoperative liver region map and the postoperative liver region map by a CPD algorithm, and obtaining of a transformation matrix; obtaining of a registration result map of the medical image map after ablation corresponding to the preoperative liver region map and the preoperative liver tumor region map according to the transformation matrix are: obtaining liver data points set of the preoperative liver region map and the postoperative liver region map, making the preoperative liver data points set of the preoperative liver region map $X_i=(x_1, \ldots, x_N)^T$ as a target point set, and making the postoperative liver data points set of the postoperative liver region map $Y_1=(y_1, \ldots, y_M)^T$ as a model point set; the target point set is the data set of Gaussian mixture model, and the model point set is the kernel point set of Gaussian mixture model; N and M represent the number of the target point set and template point set respectively; a probability density function of Gaussian mixture model is $$p(x|m) = \frac{1}{(2\prod \sigma^2)^{D/2}} \exp^{\frac{\|x-y_m\|_2^2}{2\sigma^2}},$$

$$p(x) = \omega \frac{1}{N} + (1-\omega) \sum_{m=1}^{M} \frac{1}{M} p(x|m);$$

wherein p(x|m) is a probability density basis function of Gaussian mixture model, σ represents a standard deviation of the Gaussian probability density function, ω represents a weight value of overflow points, and a value range is 0-1, x is a translation variable; calculating a minimum negative logarithm likelihood function:

$$E(\theta,\sigma^2) = -\Sigma_{n=1}^{N} \log \Sigma_{m=1}^{M+1} P(m)p(x|m),$$

wherein θ represents transformation parameters, and a represents the standard deviation of the Gaussian probability density function;

obtaining the derivative according to a gradient descent method:

$$Q(\theta, \sigma^2) = \frac{1}{2\sigma^2} \sum_{n=1}^{N} \sum_{m=1}^{M} P^{old}(m|x_n)\|x_n - \tau(y_m, \theta)\|^2 + \frac{N_p D}{2} \log \sigma^2,$$

wherein $$P(m) = \frac{1}{M},$$

$$N_P = \sum_{n=1}^{N} \sum_{m=1}^{M} P^{old}(m|x_n) \le N,$$

$$P^{old}(m|x_n) = \frac{\exp^{-\frac{1}{2}\left\|\frac{x_n-\tau(y_m,\theta^{old})}{\sigma^{old}}\right\|^2}}{\sum_{k=1}^{M} \exp^{-\frac{1}{2}\left\|\frac{x_n-\tau(y_k,\theta^{old})}{\sigma^{old}}\right\|^2} + c},$$

τ represents one of rigid, affine and non-rigid transformations, and $$c = (2\prod \sigma^2)^{D/2} \frac{\omega}{1-\omega} \frac{M}{N},$$

solving optimal parameters of the model of the minimum negative logarithm likelihood function by iteration with an Expectation-Maximization algorithm; finally, calculating a location of the preoperative liver region map corresponding to the postoperative medical image map according to the selected point cloud data and transformation parameters.

As the preferred method, the using of the medical image map before ablation, the preoperative liver region map, the preoperative liver tumor region map and the registration result map as an input of U-net network, and using of the postoperative liver tumor residual image map as a real training label; training of the network by a random gradient descent method to obtain a liver tumor prediction model are as follows: composing four channels of image data with the medical image before ablation, the preoperative liver region map, the preoperative liver tumor region map and the registration result map, and then inputting into U-net for coding to obtain a pixel classification probability map; determining the pixels with probability≥0.5 in the pixel classification probability map as liver tumors, and the pixels with probability≤0.5 as background, and finally obtaining a predicted liver tumor region.

As the preferred method, obtaining a pixel classification probability map is as follows: composing four channels of image data with the medical image before ablation, the preoperative liver region map, the preoperative liver tumor region map and the registration result map, and then inputting into U-net for coding; convoluting the input data twice, and the number of output channels of each convolution is 64, and obtaining a feature map f1, which is performed for maximum pooling; after convoluting twice, the number of output channels of each convolution is 128, and obtaining a feature map f2, which is performed for maximum pooling, after convoluting twice, the number of output channels of each convolution is 256, and obtaining a feature map f3, which is performed for maximum pooling; after convoluting twice, the number of output channels of each convolution is 512, and obtaining a feature map f4, which is performed for maximum pooling; after convoluting twice, the number of output channels of each convolution is 1024, and obtaining a feature map f5, which is the encoding process; then, decoding f5, that is, up sampling f5 and performing concat with f4, after convoluting twice, the number of output channels of each convolution is 512, and obtaining a feature map f4_1; up sampling f4_1 and performing concat with 3, after convoluting twice, the number of output channels of each convolution is 256, and obtaining a feature map 3_; up sampling 3_1 and performing concat with f2, after convoluting twice, the number of output channels of each convolution is 128, and obtaining a feature map f2_1; up sampling f2_1 and performing concat with f1, after convoluting twice, the number of output channels of each convolution is 64, and after convoluting once, the number of output channels is 2 to obtain the pixel classification probability map; the concat is to connect the two feature maps in the channel dimension.

As a preferred method, the convolution is as follows: $X_j^i = f(\Sigma_{i \in M_j} x_i^{l-1} * k_{ij}^l + b_j^l)$, wherein x represents an input characteristic channel of an accretion layer, X represents an output characteristic channel of the accretion layer, k represents a parameter of the convolution layer, b represents an offset term of the convolution layer; the symbol * represents a convolution operator; l represents a number of layers, i represents the $i^{th}$ neuron node of l−1 layer, j represents the $j^{th}$ neuron node of layer, represents a set of selected input characteristic graphs, $x_i^{l-1}$ refers to an output of l−1 layer as an input of l layer, $f$ represents an activation function, the maximum pooling is to select the maximum value in a region to represent characteristics of the region.

As a preferred method, constructing Dice loss function in a process of network training to alleviate the imbalance of background and foreground pixels; the Dice loss function is as follows:

$$d = 1 - 2\frac{pt}{p+t},$$

wherein p represents a predicted liver tumor region and t represents a real liver tumor region.

The beneficial effects of the invention are as follows:

the invention provides a method for predicting the morphological changes of liver tumor after ablation based on deep learning, which solves the problem of curative effect evaluation after ablation. It predicts the morphological changes of liver tumor after ablation with CPD point set registration and U-net network. Through the registration of liver contour before and after ablation, the transformation relationship is obtained, and then the location of preoperative liver tumor in postoperative CT/MRI image is obtained. Finally, the morphological changes of liver tumor after ablation are predicted by U-net network. The invention can predict the morphological changes of liver tumor after ablation, provide the basis for quantitatively evaluating whether the ablation area completely covers the tumor, facilitate the doctor to accurately evaluate the postoperative curative effect, and lay the foundation for the follow-up treatment plan of the patient.

DETAILED DESCRIPTION OF THE EMBODIMENTS

Figure 1:
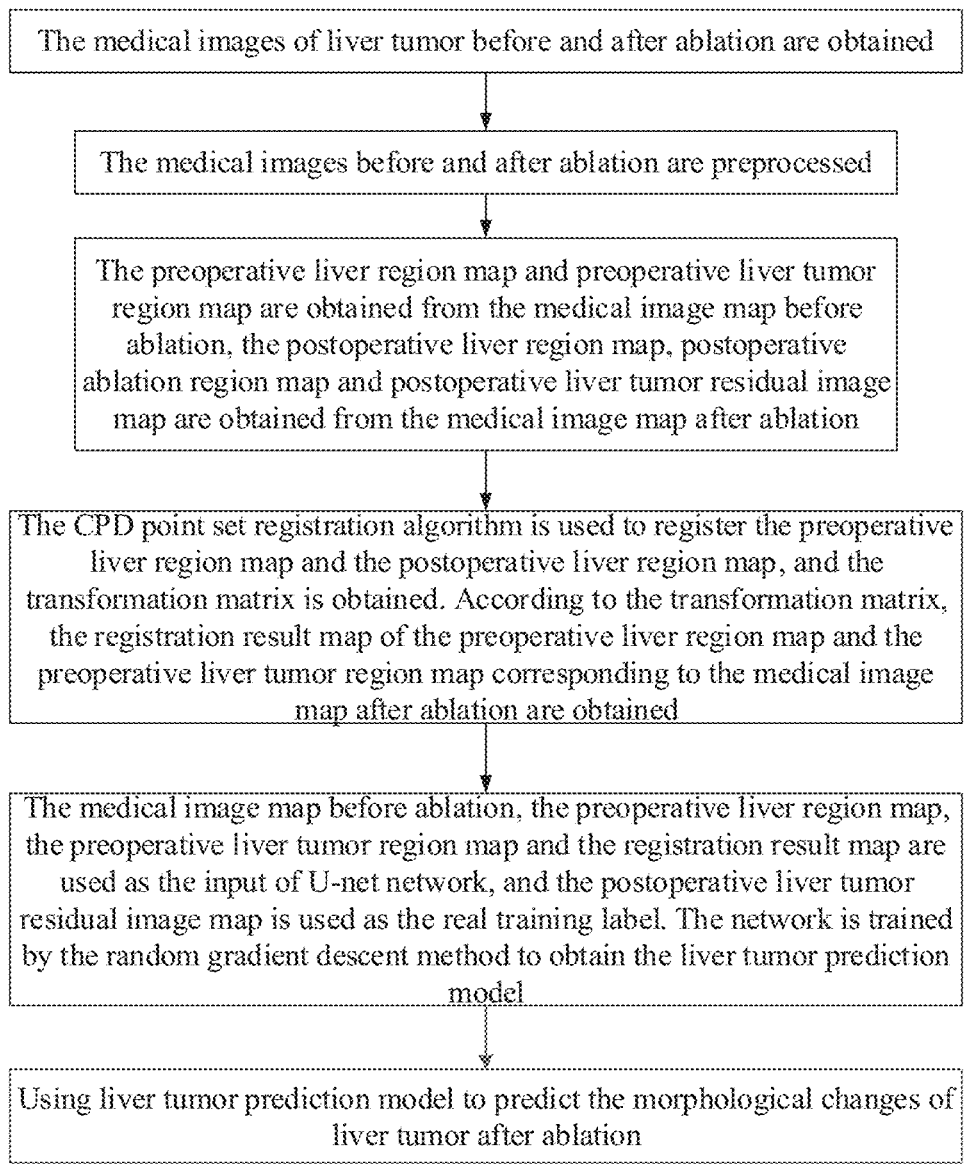
FIG. 1 is a flow chart of the present invention.

As shown in FIG. 1, this embodiment provides a method for predicting the morphological changes of liver tumor after ablation based on deep learning, including the following steps:

Step 1, CT/MRI scanning sequence images of liver tumor before and after ablation are obtained.

Step 2, the medical images before and after ablation are preprocessed as follows: the data set is divided into groups according to the influencing factors of liver, then CT/MRI scanning sequence images before and after ablation is read, and CT/MRI scanning sequence images is processed by Gaussian de-noising, gray histogram equalization, image contrast enhancement, rotation, flipping and data standardization, to increase the diversity of samples and accelerate the convergence speed of the network, wherein the liver influencing factors include liver state, tumor type, pathological type and other factors.

Figure 2:
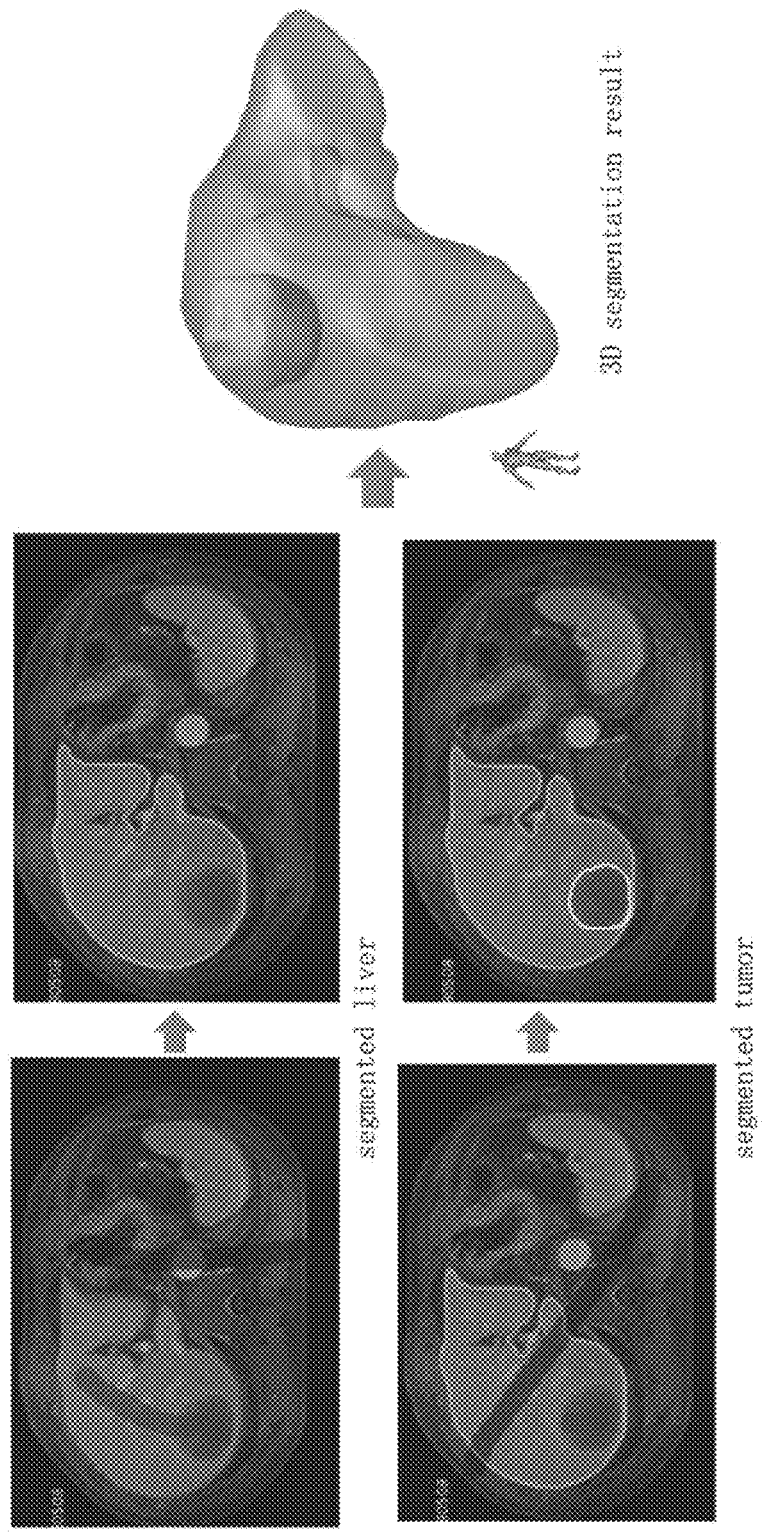
FIG. 2 is an interactive segmentation result diagram of the present invention.

Step 3, the preoperative liver region map and preoperative liver tumor region map are obtained from the medical image map before ablation, the postoperative liver region map, postoperative ablation region map and postoperative liver tumor residual image map are obtained from the medical image map after ablation. As shown in FIG. 2, specifically: the preoperative liver region map, preoperative liver tumor region map and postoperative liver region map are marked by the maximum flow/minimum cut (Max-Flow/Min-Cut) algorithm. In the segmentation process, the potential energy field function based on global and local region representation is introduced as a constraint, and the adaptive hybrid variational model is established. The maximum flow/minimum cut algorithm is used to solve the energy equation minimization. The target region is determined selectively according to the gray information, boundary gradient, texture information and local context information in different image regions. The simple interaction on single-layer data can quickly complete 3D segmentation, and the doctor can modify the segmentation result manually to complete image annotation efficiently and accurately.

Step 4, the CPD algorithm is used to register the preoperative liver region map and the postoperative liver region map, and the transformation matrix is obtained. According to the transformation matrix, the registration result map of the preoperative liver region map and the preoperative liver tumor region map corresponding to the medical image map after ablation are obtained, specifically:

Obtaining the liver data points set of the preoperative liver region map and the postoperative liver region map, making the preoperative liver data points set of the preoperative liver region map $X_i = (x_1, \ldots, x_N)^T$ as the target point set, and making the postoperative liver data points set of the postoperative liver region map $Y_i = (y_1, \ldots, y_M)^T$ as the target point set. The target point set is the data set of Gaussian mixture model, and the template point set is the kernel point set of Gaussian mixture model. N and M represent the number of target point set and template point set respectively. The probability density function of Gaussian mixture model is $$p(x|m) = \frac{1}{(2\prod \sigma^2)^{D/2}} \exp^{\frac{\|x-y_m\|_2^2}{2\sigma^2}},$$

$$p(x) = \omega\frac{1}{N} + (1-\omega)\sum_{m=1}^{M}\frac{1}{M}p(x|m);$$

wherein p(x|m) is the probability density basis function of Gaussian mixture model, a represents a standard deviation of the Gaussian probability density function, w represents the weight value of overflow point, and the value range is 0-1, x is translation variable.

Calculating the minimum negative logarithm likelihood function:

$$E(\theta,\sigma^2) = -\Sigma_{n=1}^{N} \log \Sigma_{m=1}^{M+1} P(m) p(x|m),$$

wherein θ represents transformation parameters, and σ represents the standard deviation of the Gaussian probability density function.

According to the gradient descent method, the derivative can be obtained:

$$Q(\theta, \sigma^2) = \frac{1}{2\sigma^2} \sum_{n=1}^{N} \sum_{m=1}^{M} P^{old}(m|x_n) \|x_n - \tau(y_m, \theta)\|^2 + \frac{N_p D}{2} \log \sigma^2,$$

wherein $$P(m) = \frac{1}{M},$$

$$N_P = \sum_{n=1}^{N} \sum_{m=1}^{M} P^{old}(m|x_n) \leq N,$$

$$P^{old}(m|x_n) = \frac{\exp\left(-\frac{1}{2}\left\|\frac{x_n - \tau(y_m, \theta^{old})}{\sigma^{old}}\right\|^2\right)}{\sum_{k=1}^{M} \exp\left(-\frac{1}{2}\left\|\frac{x_n - \tau(y_k, \theta^{old})}{\sigma^{old}}\right\|^2\right) + c},$$

r represents one of rigid, affine and non-rigid transformations, and $$c = (2\prod \sigma^2)^{D/2} \frac{\omega}{1-\omega} \frac{M}{N}.$$

The optimal parameters of the model of the minimum negative logarithm likelihood function are solved by Expectation-Maximization algorithm (EM). Finally, according to the selected point cloud data and transformation parameters, the location of the preoperative liver region map corresponding to CT/MRI scan sequence image after operation is calculated.

Figure 3:
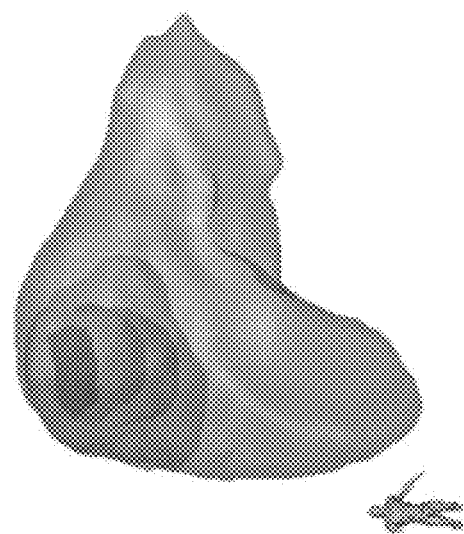
FIG. 3 is the CPD registration result diagram of the present invention.
Figure 3:
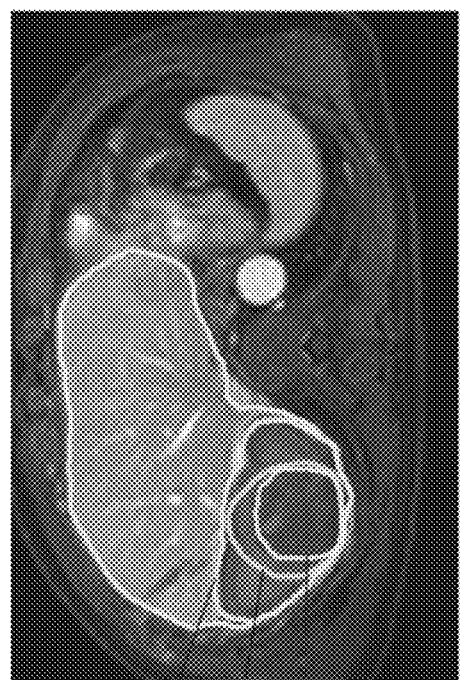

Through the registration of liver, the registration of liver tumor ablation area and liver tumor can be achieved indirectly. The registration result is shown in FIG. 3, 1 is the inactivated tumor residual image, 2 is the preoperative tumor registration transformation result, and 3 is the postoperative ablation area. It can be seen that the preliminary registration result is different from the actual tumor morphology.

Step 5, the medical image map before ablation, the preoperative liver region map, the preoperative liver tumor region map and the registration result map are used as the input of U-net network, and the postoperative liver tumor residual image map is used as the real training label. The network is trained by the random gradient descent method to obtain the liver tumor prediction model. The prediction model of liver tumor obtained is as follows: the medical image before ablation, the preoperative liver region map, the preoperative liver tumor region map and the registration result map are composed of four channels of image data, and then input into U-net for coding to obtain the pixel classification probability map. The pixels with probability≥0.5 in the pixel classification probability map are determined as liver tumors, and the pixels with probability<0.5 are determined as background, and finally the predicted liver tumor region is obtained.

Figure 4:
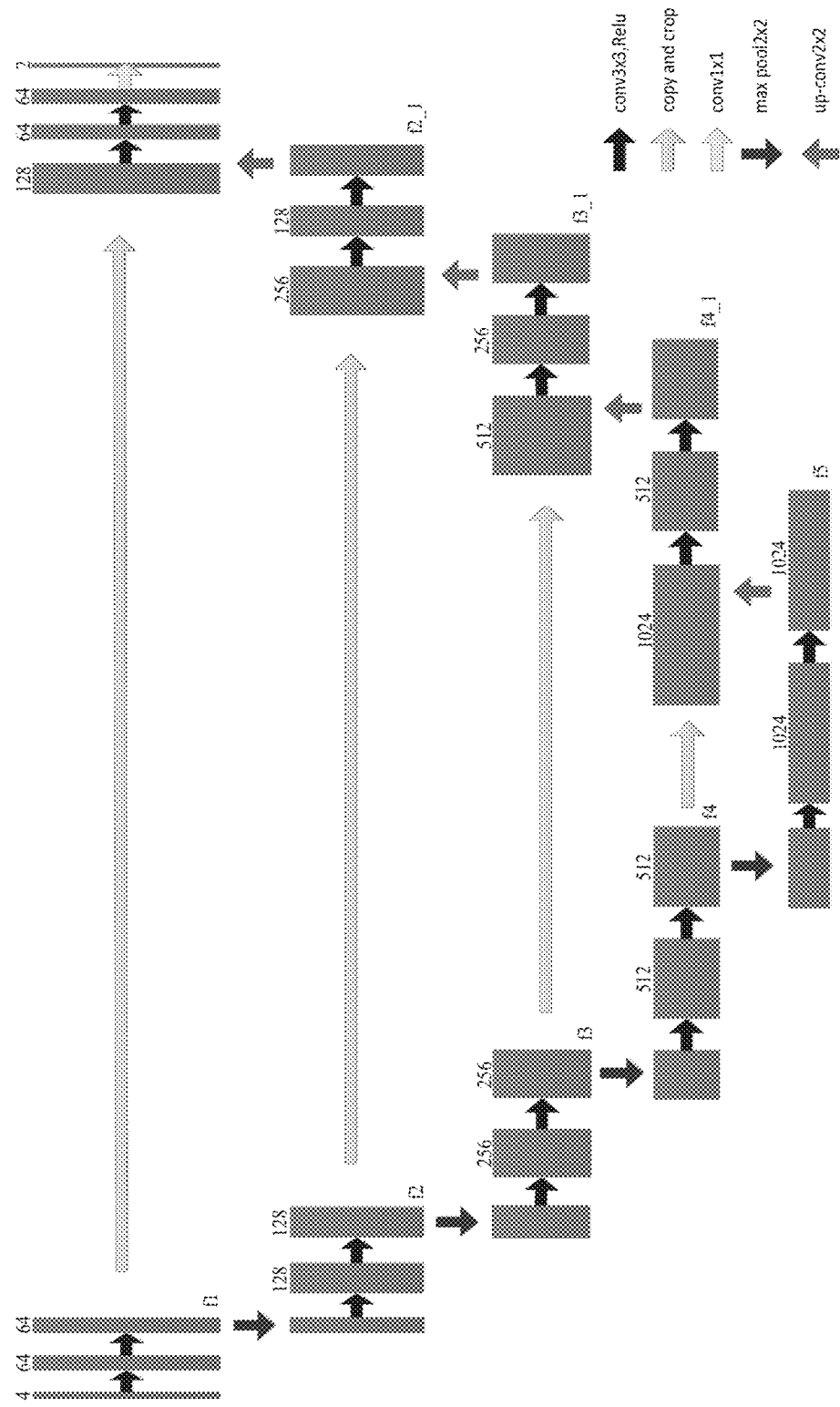
FIG. 4 is a U-net network structure diagram of the present invention.

As shown in FIG. 4, a pixel classification probability map is obtained, specially: the medical image map before ablation, the preoperative liver region map, the preoperative liver tumor region map and the registration result map are composed of four channels of image data, and then input into U-net for coding. The input data is convoluted twice, and the number of output channels of each convolution is 64, and the feature map f1 is obtained, which is performed for maximum pooling. After two convolutions, the number of output channels of each convolution is 128, and the feature map f2 is obtained, which is performed for maximum pooling. After two convolutions, the number of output channels of each convolution is 256, and the feature map f3 is obtained, which is performed for maximum pooling. After two convolutions, the number of output channels of each convolution is 512, and the feature map f4 is obtained, which is performed for maximum pooling. After two convolutions, the number of output channels of each convolution is 1024, the feature map f5 is obtained, which is the encoding process. Then, f5 is decoded, that is, f5 is up sampled and performed concat with f4. After two convolutions, the number of output channels of each convolution is 512, and the feature map f4_1 is obtained, f4_1 is up sampled and performed concat with f3. After two convolutions, the number of output channels of each convolution is 256, and the feature map f3_1 is obtained. F3_1 is up sampled and performed concat with f2. After two convolutions, the output channel of each convolution is 128, and the feature map f2_1 is obtained. F2_1 is up sampled and performed concat with f1. After two convolutions, the number of output channels of each convolution is 64, and after another convolution, the number of output channels is 2 to obtain the pixel classification probability map; the concat is to connect the two feature maps in the channel dimension.

The convolution is specifically as follows: $X_j^l = f(\Sigma_{i \in M_j} x_i^{l-1} * k_{ij}^l + b_j^l)$, wherein x represents an input characteristic channel of the accretion layer, X represents an output characteristic channel of the accretion layer, k represents a parameter of the convolution layer, b represents an offset term of the convolution layer;

the symbol * represents the convolution operator; l represents the number of layers, i represents the $i^{th}$ neuron node of l-1 layer; j represents the $j^{th}$ neuron node of l layer; $M_j$ represents the set of selected input characteristic graphs; $x_i^{l-1}$ refers to the output of l-1 layer as the input of l layer; f represents the activation function; the maximum pooling is to select the maximum value in a region to represent the characteristics of the region.

Dice loss function is constructed in the process of network training to alleviate the imbalance of background and foreground pixels. The Dice loss function is as follows:

$$d = 1 - 2\frac{pt}{p+t},$$

wherein p represents the predicted liver tumor region and t represents the real liver tumor region. The loss of a back propagation in the training process includes the loss calculated by the deviation between the predicted tumor location and the real location.

Step 6, the morphological changes of liver tumor after ablation is predicted with the liver tumor prediction model. According to the grouping of data sets in Step 2, multiple U-net network models can be obtained, and then input into the corresponding network model according to the basic liver morphology, tumor type and pathological type, and predict the tumor changes.

Figure 5:
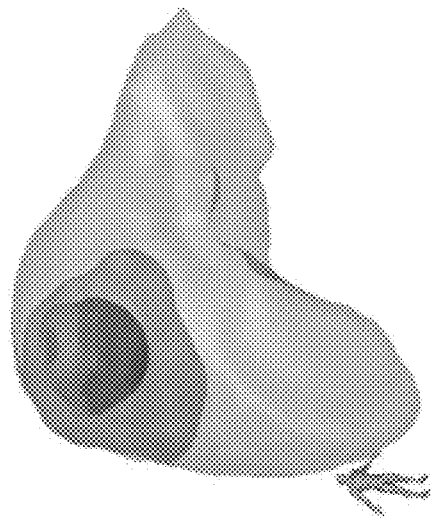
FIG. 5 is the result diagram of the tumor deformation correction in the invention.
Figure 5:
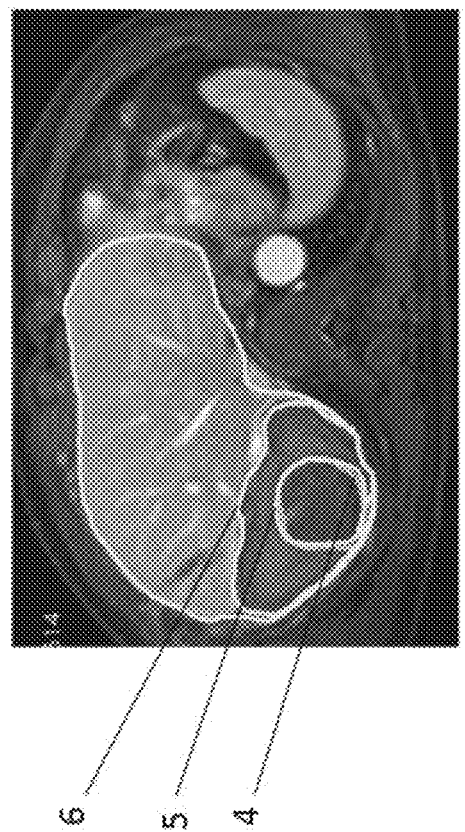

According to the changes of tumor and the actual tumor, the tumor morphology is obtained by modifying Step 4. The result of tumor deformation correction is shown in FIG. 5. 5 is the residual image of inactivated tumor, 4 is the result of preoperative tumor registration transformation, 6 is the ablation area after operation. It can be seen that the modified tumor deformation is basically consistent with the actual shape after inactivation.

The invention provides a method for predicting the morphological changes of liver tumor after ablation based on deep learning, by which solves the problem of curative effect evaluation after ablation. It predicts the morphological changes of liver tumor after ablation with CPD point set registration and U-net network. Through the registration of liver contour before and after ablation, the transformation relationship is obtained, and then the location of preoperative liver tumor in postoperative CT/MRI image is obtained. Finally, the morphological changes of liver tumor after ablation are predicted by U-net network. The invention can predict the morphological changes of liver tumor after ablation, provide the basis for quantitatively evaluating whether the ablation area completely covers the tumor, facilitate the doctor to accurately evaluate the postoperative curative effect, and lay the foundation for the follow-up treatment plan of the patient.

The invention is not limited to the above optional embodiments, and anyone can obtain various other forms of products under the enlightenment of the invention. The above specific embodiments should not be understood as limiting the scope of protection of the invention. The scope of protection of the invention should be defined in the claims, and the specification can be used to explain the claims.

What is claimed is:

1. A method for predicting morphological changes of liver tumor after ablation based on deep learning, comprising:
    1) Obtaining a data set comprising a medical image of the liver tumor before the ablation and a medical image of the liver tumor after the ablation;
    2) Pre-processing the medical image of the liver tumor before the ablation and the medical image of the liver tumor after the ablation;
    3) Obtaining a preoperative liver region map and a preoperative liver tumor region map from a medical image map before the ablation, and obtaining a postoperative liver region map, a postoperative ablation region map, and a postoperative liver tumor residual image map from a medical image map after the ablation;
    4) Registering the preoperative liver region map and the postoperative liver region map by a Coherent Point Drift (CPD) algorithm, and obtaining a transformation matrix; obtaining a registration result map of the medical image map after the ablation corresponding to the preoperative liver region map and the preoperative liver tumor region map according to the transformation matrix;
    5) using the medical image map before the ablation, the preoperative liver region map, the preoperative liver tumor region map and the registration result map as an input of U-net network, and using the postoperative liver tumor residual image map as a real training label; training the U-net network by a random gradient descent method to obtain a liver tumor prediction model; and
    6) using the liver tumor prediction model to predict the morphological changes of the liver tumor after the ablation;

wherein step 3 comprises: marking the preoperative liver region map, the preoperative liver tumor region map, and the postoperative liver region map by a maximum flow/minimum cut algorithm; introducing a potential energy field function based on a global and local region representation as a constraint in a segmentation process, and establishing an adaptive hybrid variational model; using the maximum flow/minimum cut algorithm to solve an energy equation minimization; determining a target region selectively according to gray information, boundary gradient, texture information and local context information in different image regions;

wherein step 4 comprises: obtaining liver data point set of the preoperative liver region map and the postoperative liver region map, making the liver data point set of the preoperative liver region map $X_i=(x_1, \ldots, x_N)^T$ as a target point set, and making the liver data point set of the postoperative liver region map $Y_i=(y_1, \ldots, y_M)^T$ as a model point set, wherein the target point set is a data set of Gaussian mixture model, and the model point set is a kernel point set of the Gaussian mixture model; N and M respectively represent a number of points in the target point set and a number of the model point set; a probability density function of the Gaussian mixture model is:

$$p(x|m) = \frac{1}{(2\prod\sigma^2)^{D/2}} \exp^{\frac{\|x-y_m\|_2^2}{2\sigma^2}}$$

$$p(x) = \omega\frac{1}{N} + (1-\omega)\sum_{m=1}^{M}\frac{1}{M}p(x|m);$$

wherein p(x|m) is a probability density basis function of the Gaussian mixture model, σ represents a standard deviation of the probability density function, ω represents a weight value of overflow points, and a value range is 0-1, x is a translation variable;

calculating a minimum negative logarithm likelihood function:

$$E(\theta,\sigma^2) = -\Sigma_{n=1}^{N} \log \Sigma_{m=1}^{M+1} P(m)p(x|m),$$

θ represents transformation parameters, and σ represents the standard deviation of the probability density function;

obtaining a derivative according to a gradient descent method:

$$Q(\theta, \sigma^2) = \frac{1}{2\sigma^2}\sum_{n=1}^{N}\sum_{m=1}^{M} P^{old}(m|x_n)\|x_n - \tau(y_m, \theta)\|^2 + \frac{N_p D}{2}\log\sigma^2,$$

wherein $$P(m) = \frac{1}{M},$$

$$N_P = \sum_{n=1}^{N}\sum_{m=1}^{M} P^{old}(m|x_n) \le N,$$

-continued $$P^{old}(m|x_n) = \frac{\exp{-\frac{1}{2}\left\|\frac{x_n-\tau(y_m,\theta^{old})}{\sigma^{old}}\right\|^2}}{\sum_{k=1}^{M}\exp{-\frac{1}{2}\left\|\frac{x_n-\tau(y_k,\theta^{old})}{\sigma^{old}}\right\|^2} + c},$$

τ represents one of rigid, affine and non-rigid transformations, and $$c = (2\prod\sigma^2)^{D/2}\frac{\omega}{1-\omega}\frac{M}{N};$$

solving optimal parameters for the transformation parameters of the minimum negative logarithm likelihood function by iteration with an Expectation-Maximization algorithm; and calculating a location of the preoperative liver region map corresponding to the medical image map after the ablation according to selected point cloud data and the optimal parameters for the transformation parameters, wherein the selected point cloud data comprise the liver data point set of the preoperative liver region map $X_i=(x_1, \ldots, X_N)^T$ and the liver data point set of the postoperative liver region map $Y_i=(y_1, \ldots, y_M)^T$.

2. The method according to claim 1, wherein the medical images each comprises an image obtained from computed tomography (CT) and magnetic resonance imaging (MRI).

3. The method according to claim 1, wherein step 2 comprises: dividing the data set into groups according to liver influencing factors, then reading the medical image of the liver tumor before the ablation and the medical image of the liver tumor after the ablation, and processing the medical image of the liver tumor before the ablation and the medical image of the liver tumor after the ablation by Gaussian de-noising, gray histogram equalization, image contrast enhancement, rotation, flipping and data standardization.

4. The method according to claim 3, wherein the liver influencing factors comprise a liver state, a tumor type, and a pathological type.

5. The method according to claim 1, wherein step 5 comprises: composing input data comprising four channels of image data with the medical image before the ablation, the preoperative liver region map, the preoperative liver tumor region map, and the registration result map, and then inputting into the U-net network for coding to obtain a pixel classification probability map; determining pixels with probability≥0.5 in the pixel classification probability map as the liver tumor, and pixels with probability<0.5 as background, and finally obtaining a predicted liver tumor region.

6. The method according to claim 5, wherein the step of obtaining the pixel classification probability map comprises:
composing the input data comprising the four channels of the image data with the medical image before the ablation, the preoperative liver region map, the preoperative liver tumor region map, and the registration result map, and then inputting the input data into the U-net network for coding;
convoluting the input data twice, and a number of output channels of each convolution is 64, and obtaining a feature map f1 for maximum pooling;
convoluting twice, the number of output channels of each convolution is 128, and obtaining a feature map f2 for the maximum pooling;
convoluting twice, the number of output channels of each convolution is 256, and obtaining a feature map f3 for the maximum pooling;
convoluting twice, the number of output channels of each convolution is 512, and obtaining a feature map f4 for the maximum pooling;
convoluting twice, the number of output channels of each convolution is 1024, and obtaining a feature map f5 for an encoding process;
decoding the feature map f5, comprising sampling the feature map f5 and performing concat with the feature map f4, after convoluting twice, the number of output channels of each convolution is 512, and obtaining a feature map f4_1;
up sampling the feature map f4_1, and performing concat with the feature map f3, after convoluting twice, the number of output channels of each convolution is 256, and obtaining a feature map f3_1;
up sampling the feature map f3_1, and performing concat with the feature map f2, after convoluting twice, the number of output channels of each convolution is 128, and obtaining a feature map f2_1;
up sampling the feature map f2_1, and performing concat with the feature map f1, after convoluting twice, the number of output channels of each convolution is 64, and after convoluting once, the number of output channels is 2 to obtain the pixel classification probability map; wherein the concat is to connect two feature maps in a channel dimension.

7. The method according to claim 6, wherein each of the convoluting steps is based on $X_j^l=f(\Sigma_{i\in M_j}x_i^{l-1}*k_{ij}^l+b_j^l)$,
wherein
x represents an input characteristic channel of an accretion layer,
X represents an output characteristic channel of the accretion layer,
k represents a parameter of a convolution layer,
b represents an offset term of the convolution layer,
the symbol * represents a convolution operator,
l represents a number of layers,
i represents $i^{th}$ neuron node of l–1 layer,
j represents $j^{th}$ neuron node of l layer,
$M_j$ represents a set of selected input characteristic graphs,
$x_i^{l-1}$ refers to an output of the l–1 layer as an input of the l layer,
f represents an activation function, and
the maximum pooling is to select a maximum value in a region to represent characteristics of the region.

8. The method according to claim 7, wherein step 5 comprises constructing Dice loss function in a process of training the U-net network to alleviate an imbalance of background and foreground pixels,
wherein the Dice loss function is as follows:

$$d = 1 - 2\frac{pt}{p+t},$$

wherein p represents the predicted liver tumor region and t represents a real liver tumor region.

\* \* \* \* \*